United States Patent
Yi

(10) Patent No.: US 7,197,129 B2
(45) Date of Patent: Mar. 27, 2007

(54) APPARATUS AND METHOD FOR TRANSLATING GLOBAL TITLE IN NO. 7 SIGNALING NETWORK

(75) Inventor: Seung-Hee Yi, Kyunggi-Do (KR)

(73) Assignee: LG Nortel Co., Ltd., Seoul (KR)

( * ) Notice: Subject to any disclaimer, the term of this patent is extended or adjusted under 35 U.S.C. 154(b) by 1249 days.

(21) Appl. No.: 10/138,657

(22) Filed: May 6, 2002

(65) Prior Publication Data

US 2002/0181502 A1 Dec. 5, 2002

(30) Foreign Application Priority Data

May 7, 2001 (KR) .............................. 2001-24611

(51) Int. Cl.
*H04M 7/00* (2006.01)
(52) U.S. Cl. .............................. 379/221.08; 379/221.1; 379/230
(58) Field of Classification Search ............................... 379/221.08–221.12, 229, 230
See application file for complete search history.

(56) References Cited

U.S. PATENT DOCUMENTS

| | | | | |
|---|---|---|---|---|
| 5,481,603 A | * | 1/1996 | Gutierrez et al. ...... | 379/221.09 |
| 5,708,702 A | * | 1/1998 | De Paul et al. .......... | 379/221.1 |
| 5,838,782 A | * | 11/1998 | Lindquist ................. | 379/221.1 |
| 5,940,492 A | * | 8/1999 | Galloway et al. .......... | 379/230 |
| 5,953,404 A | * | 9/1999 | Fikis et al. ................ | 379/230 |
| 6,167,129 A | * | 12/2000 | Fikis et al. ................ | 379/230 |
| 6,577,723 B1 | * | 6/2003 | Mooney ................. | 379/221.08 |
| 7,054,422 B2 | * | 5/2006 | Delaney et al. ............. | 379/137 |

\* cited by examiner

*Primary Examiner*—Harry S. Hong
(74) *Attorney, Agent, or Firm*—Ked & Associates, LLP

(57) ABSTRACT

In an apparatus and a method for translating a GT (global title) in a No.7 signaling network, the apparatus includes a general GTT module performing a general GTT function of a specific signaling point, a pre-fetch GTT module distributing the general GTT function to another signaling point before the general GTT function is performed, and a post-fetch GTT module providing the general GTT function to the another signaling point when the general GTT function has failed. Accordingly, it is possible to provide various GTT types to a signaling network and control a GTT type of a specific signaling point in signaling network operation by controlling a pre-fetch GTT module and a post-fetch GTT module of each signaling point.

22 Claims, 4 Drawing Sheets

| 8 | 7 | 6 | 5 | 4 | 3 | 2 | 1 |
|---|---|---|---|---|---|---|---|
| RESERVED FOR NATIONAL USE | ROUTING INDICATOR | GT INDICATOR ||| SSN INDICATOR | SPC INDICATOR |

APPARATUS AND METHOD FOR TRANSLATING GLOBAL TITLE IN NO. 7 SIGNALING NETWORK

BACKGROUND OF THE INVENTION

1. Field of the Invention

The present invention relates to a common channel signaling (CCS) system, and in particular to an apparatus and a method for translating a global title in a No.7 signaling network.

2. Background of the Related Art

Generally, a common channel signaling is a signaling method for transmitting a signal about a call through a signaling line that is separate from the traffic line.

FIG. 1 is block diagram illustrating a No. 7 signaling network as an example of one CCS methods. As depicted in FIG. 1, a signaling point of the No.7 signaling network is divided into a signaling end point (SEP) A, F and a signaling transfer point (STP) B, C, D, and E.

FIG. 2 is a block diagram illustrating a protocol stack of each signaling point of the No.7 signaling network.

A protocol of each signaling point includes a telephone user part (TUP) 1 performing functions for telephone signaling processing and exchange access control, etc., and an ISDN user part (ISUP) 3 for providing a circuit switching service and a supplementary service for voice and non-voice applications of an ISDN (Integrated Services Digital Network). The protocol structure further includes a transaction capabilities (TC) part 5 for performing an exchange function and controlling functions of special centers (a database, a special facilities unit, an operation & maintenance center) regardless of circuit switching, a signaling connection control part (SCCP) 7 for making possible transmission of various signals and data besides the circuited line control signal, and a message transfer part (MTP) 9 for performing transmission of a signaling message. The TUP 1, ISUP 3, and SCCP 7 are MTP user parts, and the TC 5 is a SCCP user part.

To provide an additional service, the SCCP 7 performs efficient transmission of signaling information between an exchanger and an exchanger, or between an exchanger and a database not having a direct bearing on a circuited processing. For example, when a service is performed by utilizing a database of a remote service control point placed apart from an exchanger, the SCCP 7 supplements a function of the MTP 9 in order to efficiently transmit a non-circuit related signal required for an inquiry and a reply about a database between the exchanger and the service control point.

A signaling transfer point among signaling points of the No.7 signaling network may not have a protocol stack such as the TUP 1, the ISUP 3, the TC 5, etc.

In the No.7 signaling network, a method for routing a signaling message received from the SCCP TC 5 to a destination signaling point is generally divided into two types. One is a routing by a sub-system number (SSN) and a signaling point code (SPC), and the other is a routing by a global title (GT).

FIG. 3 illustrates an example of a format of an address indicator of a SCCP signaling message format. As depicted in FIG. 3, an address indicator of a SCCP signaling message is 8 bits, and it includes a point code indicator, a SSN indicator, a GT indicator, a routing indicator, and a bit reserved for national use.

The point code indicator indicates whether a valid point code (signaling point code) is recorded on an SCCP signaling message and the SSN indicator indicates whether a valid SSN is recorded on the SCCP signaling message. The global title indicator indicates whether a valid global title is recorded on the SCCP signaling message and a type of the global title when a valid global title is recorded. The routing indicator indicates a routing method of the SCCP signaling message.

Accordingly, using the routing indicator of the address indicator of the signaling message, a signaling message routing method of the No.7 signaling network is determined. When the routing indicator indicates routing by a global title, the signaling message is routed by the routing method according to the global title.

A global title is an address constructed with digits such as a telephone number. It is a major part of a signaling message used for permitting an indirect routing other than by an address of a destination signaling point in a signaling network.

Because the MTP 9 is a lower layer protocol of the SCCP 7, it can route a signaling message only by a SSN and a signaling code. In order to perform the routing by a global title, a global title translation (GTT) has to first be performed. The GTT is used to map a global title included in a signaling message into a SSN and a signaling point code recognizable by the MTP 9. GTT is performed in the SCCP 7.

FIG. 4 illustrates an embodiment of a related art global title translation apparatus in a No.7 signaling network. The global title translation apparatus is typically provided in the SCCP 7.

As shown in FIG. 4, the related art global title translation apparatus in the No.7 signaling network includes a general GTT module 20 performing global title translation by referring to a global title translation database (not shown in FIG. 4) when a signaling message routed by the global title is received.

To transmit an SCCP signaling message from signaling point A to signaling point F using the global title routing function, the GTT can be divided into three types according to a global title translation point. In the first type, global title translation is performed at an originating signaling point (signaling point A). In the second type, global title translation is performed at a signaling transfer point (signaling point B, C, D, or E). In a third type, a first global title translation is performed at an originating signaling point (signaling point A) and a second global title translation is performed at a signaling transfer point (signaling point B, C, D or E).

A global title translation type is generally predetermined in construction of a signaling network, and an administrator of a signaling network maintains and manages global title translation information according to a global title translation type by using a translation database.

In order to transmit a signaling message from signaling point A to signaling point F, the SCCP TC 5 of an originating signaling point (signaling point A) transmits a signaling message to the SCCP 7 of a destination signaling point. Then, a general GTT module 20 of a global title translation apparatus of the SCCP 7 translates a global title included in a received signaling message by referring to a global title translation database of the originating signaling point. The SCCP 7 transmits the received signaling message to the MTP 9, and the MTP 9 transmits the signaling message to a pertinent signaling point in order to transmit the signaling message to a signaling point code as a result value of the global title translation.

The related art No. 7 signaling network has various problems. For example, in the related art No. 7 signaling network, because an administrator of a signaling network has to maintain and manage all global titles used in a signaling network in a global title translation database, transmission of a signaling message by using a routing function according to a global title is intricate when a large quantity of global title translation data exists.

In addition, because global title translation data of each signaling point is maintained and managed according to a predetermined global title translation type, in the related art global title translation apparatus in the No.7 signaling network, whenever a change of a global title translation type is required, an administrator of a signaling network has to change a global title translation database every time. Accordingly it is difficult to change a global title translation type of a signaling network.

Additionally, in the related art global title translation apparatus in the No.7 signaling network, because a global title translation database has to be retrieved in order to find a signaling transfer point, a global title translation function is performed only at a signaling transfer point. Thus, much time is consumed in a signaling message processing, and system performance is lowered.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an apparatus and a method for translating a global title in a No.7 signaling network which are capable of supporting various global title translation types.

It is another object of the present invention to provide an apparatus and a method for translating a global title which are capable of performing a global title translation quickly and efficiently.

It is yet another object of the present invention to provide an apparatus and a method for translating a GT which are capable of facilitating change and repair of a GTT database of a specific signaling point.

It is another object of the present invention to provide an apparatus and a method for translating a GT which reduces a quantity of a GTT database to be managed.

It is another object of the present invention to provide an apparatus and a method for translating a GT which performs a GTT quickly by not performing a GTT of a signaling message at a specific signaling point, but rather by transmitting the signaling message to another signaling point when an error occurs at the specific signaling point receiving the signaling message including a GT address.

It is another object of the present invention to provide an apparatus and a method for translating a GT which performs a GTT of the signaling message at another signaling point when a GTT is performed at a first signaling point receiving the signaling message, but has failed.

In order to achieve the above-mentioned objects in whole or in parts, there is provided an apparatus for translating a GT in a No.7 signaling network, including a general GTT module performing a general GTT function at a specific signaling point, a pre-fetch GTT module distributing the general GTT function to another signaling point and a post-fetch GTT module providing again the general GTT function to the another signaling point when the general GTT function has failed.

In order to further achieve the above-mentioned objects in whole or in parts, there is provided a method for translating a GT in a No.7 signaling network, including checking whether a pre-fetch GTT module is enabled when a transmission request of a signaling message including a GT is received at a specific signaling point, performing a pre-fetch GTT when the pre-fetch GTT module is enabled, performing a general GTT when the pre-fetch GTT module is not enabled, checking whether a post-fetch module is enabled when the general GTT is failed, performing a post-fetch GTT when the post-fetch GTT module is enabled and discarding the signaling message when the post-fetch GTT module is not enabled.

In order to further achieve the above-mentioned objects in whole or in parts, there is provided a method for translating a GT (global title) in a No.7 signaling network, including controlling a pre-fetch GTT function and a post-fetch GTT function of each signaling point according to a GTT type applied to a signaling network and performing a GTT according to the controlled pre-fetch GTT function and the post-fetch GTT function.

Additional advantages, objects and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Hereinafter, preferred embodiments of the present invention will be described with reference to accompanying drawings.

Figure 5:
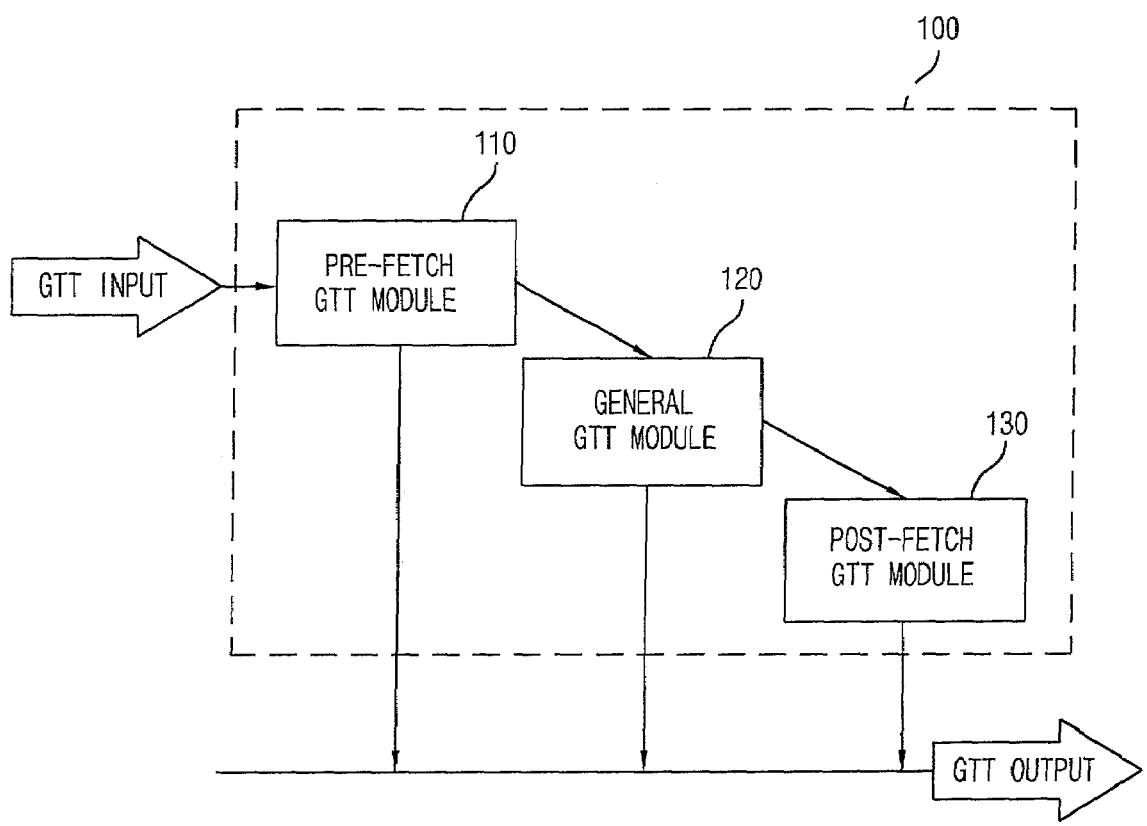
FIG. 5 illustrates a GTT (global title translation) apparatus in a No.7 signaling network in accordance with a preferred embodiment of the present invention.

Referring to FIG. 5, a global title translation (GTT) apparatus 100 in accordance with the preferred embodiment of the present invention includes a general GTT module 120 to perform a general GTT function at a specific signaling point. The GTT apparatus 100 further includes a pre-fetch GTT module 110 to distribute the general GTT function to another signaling point before the general GTT function is performed, and a post-fetch GTT module 130 to provide the general GTT function to the another signaling point when the general GTT function fails.

The general GTT module 120 is configured to perform the general GTT. It determines a destination signaling point of the signaling message by translating a GT of a signaling message transmitted to a SCCP of a specific signaling point, and at the same determines a routing path to the destination signaling point. In translation of the GT, a general GTT database used.

The pre-fetch GTT module 110 and the post-fetch GTT module 130 respectively have a pre-fetch GTT database and a post-fetch GTT database to provide independence from each other. The pre-fetch GTT database and the post-fetch GTT database each have the same structure, as shown in Table 1.

TABLE 1

| Field Name | Field Content | Remarks |
| --- | --- | --- |
| Activation | Enabled/Disabled | Display an active/inactive state of a pertinent function |
| Signaling Point Code | Bit-14 | Signaling point code transmitting a signaling message including a GT |

As shown in Table 1, the pre-fetch database and the post-fetch database respectively include a field for displaying an enabled/disabled state of a pertinent function, and a signaling point code for transmitting a pertinent signaling message.

Figure 1:
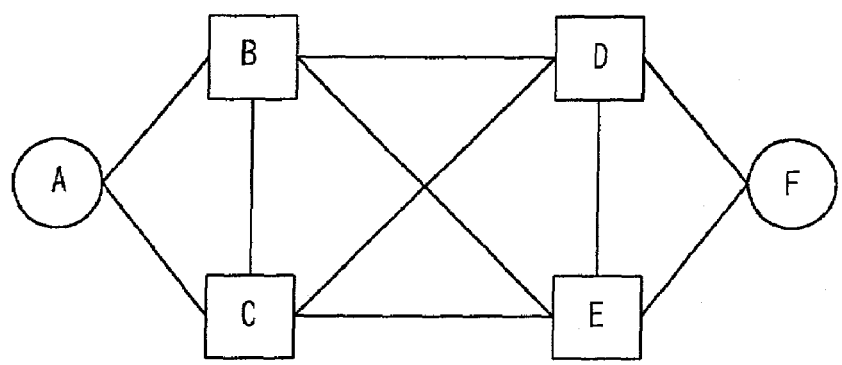
FIG. 1 is a block diagram illustrating an embodiment of a general signaling network applied a No.7 signaling method.
Figure 2:
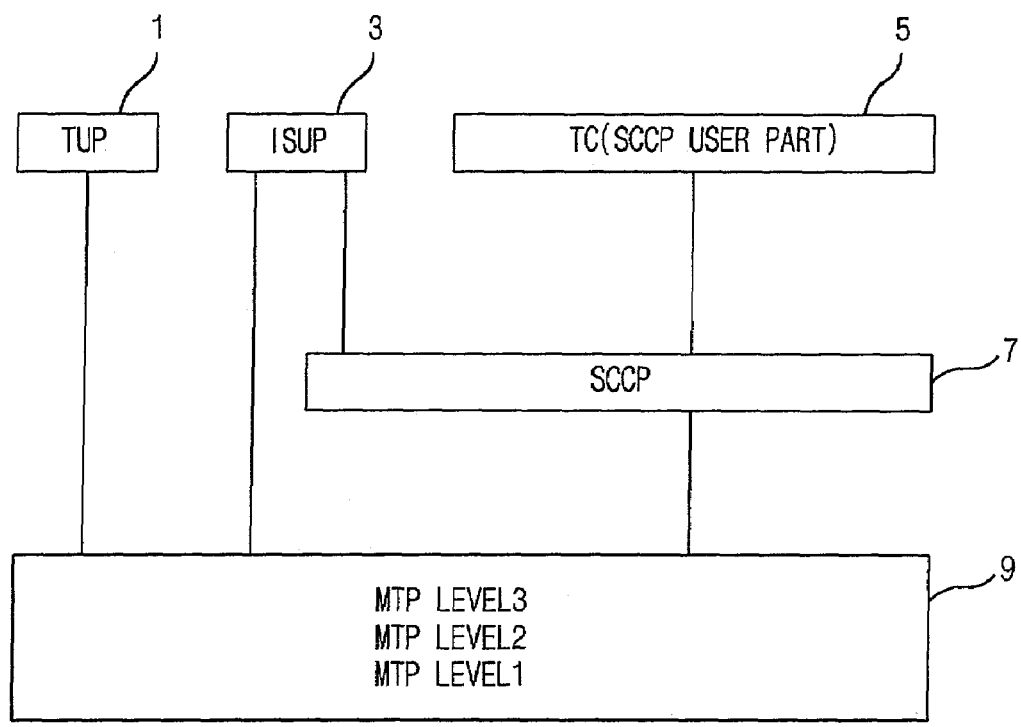
FIG. 2 is a block diagram illustrating a construction of a protocol stack of each signaling point constructing a No.7 signaling network.
Figures 3, 4:
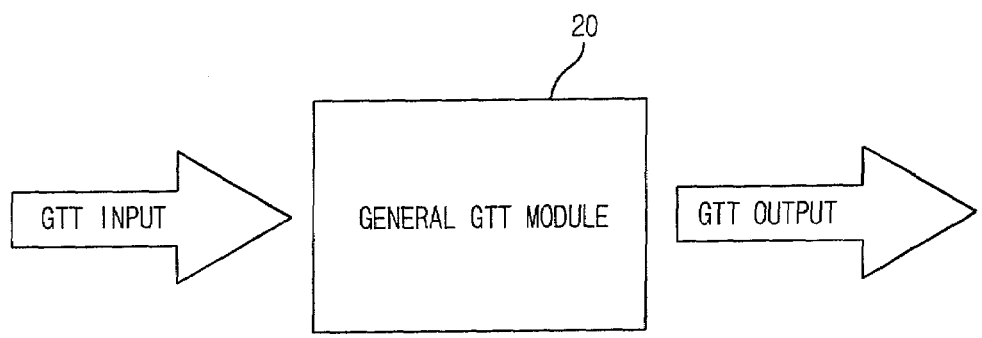
FIG. 3 illustrates an embodiment of a format of an address indicator in a SCCP signaling message format.
FIG. 4 illustrates an embodiment of a construction of a related art GTT (global title translation) apparatus in a No.7 signaling network.

An operation of the GTT apparatus 100 in accordance with the preferred embodiment of the present invention will be described below. A No.7 signaling network as depicted in FIG. 1 will be referred to in order to describe the operation of the GTT apparatus 100.

Figure 6:
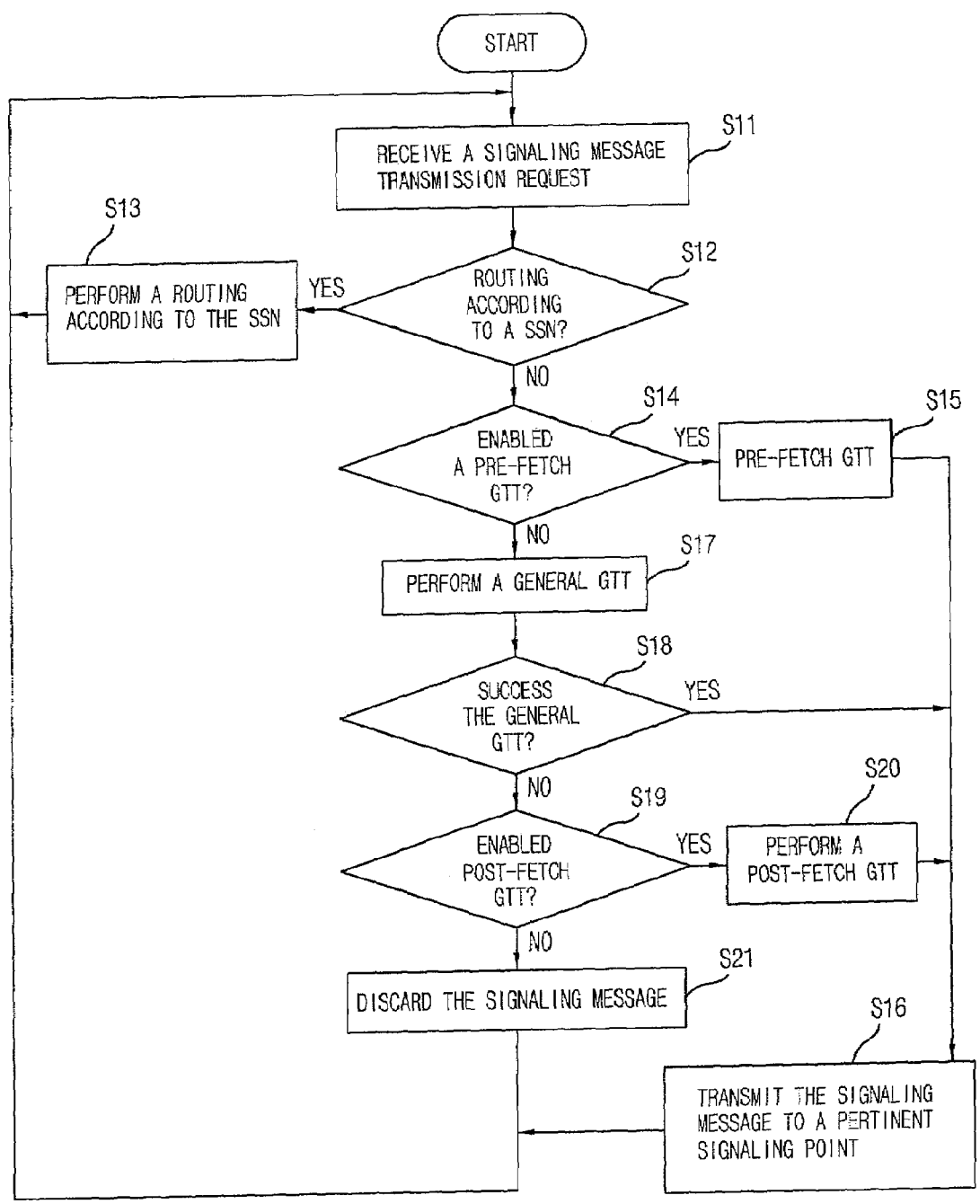
FIG. 6 is a flow chart illustrating a GTT (global title translation) method in a No.7 signaling network in accordance with a preferred embodiment of the present invention.

FIG. 6 is a flow chart illustrating a GTT method in a No.7 signaling network in accordance with a preferred embodiment of the present invention.

In order to transmit a signaling message from signaling point A (originating signaling point) to signaling point F (destination signaling point), the originating signaling point generates a signaling message. Thus, the SCCP TC 5 (SCCP user part) generates a signaling message and transmits it to the SCCP 7 as a lower layer protocol, as shown at step S11. The SCCP 7 of the originating signaling point then determines a routing method of the received signaling message, as shown at step S12.

Thus, the SCCP 7 checks a routing indicator in address indicators of the received signaling message. When the routing indicator indicates a routing by a sub-system number (SSN) and a signaling point code, the SCCP 7 preferably performs a routing of the received signaling message by the SSN and the signaling point code, as shown at step S13.

However, when the routing indicator indicates a routing by a GT, the GTT apparatus 100 of the SCCP 7 preferably determines whether a pre-fetch GTT of the originating signaling point is enabled, as shown at step S14. The pre-fetch GTT module 110 of the GTT apparatus 100 thus checks whether the pre-fetch GTT is enabled by retrieving a pre-fetch GTT database. When the pre-fetch GTT is in the active state, the GTT apparatus 100 preferably performs a pre-fetch GTT as shown at step S15. In other words, the GTT apparatus 110 selects a signaling point for performing a GTT of the received signaling message by referring to the pre-fetch GTT database and transmits the received signaling message to the selected signaling point according to a load sharing method, as shown at step S16.

If, at step S14, it is determined that the pre-fetch GTT is not enabled, the GTT apparatus 100 of the SCCP 7 preferably performs the general GTT as shown at step S17. Thus, the general GTT module 120 of the GTT apparatus 100 translates the GT included in the received signaling message into an SSN and a signaling code. This is preferably done by referring to the general GTT database. The GTT apparatus 100 then determines a routing path of the translated SSN and the signaling code.

The GTT apparatus 100 preferably next determining whether the general GTT has been performed successfully, as shown at step S18. When the general GTT has been performed successfully, the GTT apparatus 100 transmits the received signaling message to a pertinent signaling point according to a result of the GTT, as shown at step S16.

However, if it is determined in step S18 that the general GTT has not been performed successfully, the post-fetch GTT module 130 of the GTT apparatus 100 preferably retrieves the post-fetch GTT database, and checks whether the post-fetch GTT is enabled as shown at step S19. When the post-fetch GTT is not enabled, the GTT apparatus 100 preferably discards the received signaling message, as shown at step S21.

However, when the post-fetch GTT is enabled, the post-fetch GTT module 130 preferably performs a post-fetch GTT, as shown at step S20. Thus, the post-fetch GTT module 130 preferably selects a signaling point to re-perform a GTT of the received signaling message by referring to the post-fetch GTT database. The post-fetch GTT module 130 transmits the received signaling message to the selected signaling point so as to make the selected signaling point perform the GTT of the received signaling message, as shown at step S16. As described above, the GTT apparatus of the SCCP 7 of the originating signaling point re-provides the general GTT to another signaling point by using the post-fetch GTT module 130.

The above-described GTT apparatus 100 is preferably included in a signaling point having a SCCP protocol.

In more detail, when a GTT type in the No.7 signaling network is a type performing a GTT function at a signaling transfer point, in order to transmit a signaling message from signaling point A (originating signaling point) to signaling point F (destination signaling point), because signaling point A does not have to perform a general GTT, an administrator of the signaling network controls a pre-fetch GTT database of the originating signaling point to enable a pre-fetch GTT function of the originating signaling point. Then, at the originating signaling point, the pre-fetch GTT module 110 of the GTT apparatus 100 transmits the signaling message to the signaling transfer point recorded on the pre-fetch GTT database. The originating signaling point does not perform the general GTT, but rather directly transmits the signaling message to the signaling transfer point set on the pre-fetch GTT database.

In addition, when the specific signaling point cannot perform the GTT function, for example due to modification or repair of a general GTT database of a specific signaling point, a signaling network administrator preferably activates the pre-fetch GTT function of the specific signaling point. When the specific signaling point receives the signaling message, it preferably transmits the received signaling message to the signaling code recorded in the pre-fetch GTT database. The signaling point receiving the signaling message then performs the GTT.

However, when a specific signaling point, for example, an originating signaling point, can perform a GTT, the signaling network administrator preferably sets the pre-fetch GTT function of the originating signaling point to a disabled state. In addition, when a GTT type in the No.7 signaling network is set to a type performing a GTT of an originating signaling point, the signaling network administrator preferably sets the pre-fetch GTT function of the originating signaling point to a disabled state. Then, the originating signaling point immediately performs a general GTT function for the signaling message including the GT.

In the meantime, in the general GTT of the originating signaling point, for example, when most signaling messages are transmitted to signaling point B, a second part of the signaling message is transmitted to signaling point C. The originating signaling point maintains only GTT information of the second part of the signaling messages (signaling message to be transmitted to the signaling point C), and signaling point B maintains GTT information of the other signaling messages (signaling messages to be transmitted to the signaling point B).

Thus, the signaling network administrator manages only GTT information of the signaling message to be transmitted to signaling point C. The network administrator also sets the pre-fetch GTT function of the originating signaling point to the disabled state, and sets the post-fetch GTT function of the originating signaling point to the enabled state. In addition, the signaling network administrator manages the GTT information of the signaling messages to be transmitted to signaling point B in the general GTT data of the signaling point B.

When the originating signaling point later receives the signaling message including the GT, it preferably performs the general GTT immediately, among the received signaling messages, the signaling message to be transmitted to signaling point C is transmitted to the signaling point C. However, in the signaling messages to be transmitted to the signaling point B of the received signaling messages, because the general GTT has failed, the originating signaling point determines whether the post-fetch GTT function is enabled. When the post-fetch GTT function is enabled, the originating signaling point transmits the signaling message that failed the general GTT to a pertinent signaling point (for example, signaling point B) by referring to the post-fetch GTT database. The GTT of the signaling message that failed the general GTT at the originating signaling point is performed again at the signaling point B.

Accordingly, in the result of the GTT at the specific signaling point, when most of the translation results are identified and part of the translation results shows a different result, by operating the post-fetch GTT function of the specific signaling point, when the specific signaling point manages not all GTs used in the signaling network but only part of GT, the GTT of all signaling messages in the signaling network can be generally performed.

As described above, the apparatus, and method for translating a GT in a No.7 signaling network in accordance with the preferred embodiment of the present invention has many advantages. For example, it is possible to change a GTT type of a signaling network according to an enabled/disabled setting of a pre-fetch GTT function and a post-fetch GTT function. A change of a GTT type in a signaling network can also be facilitated, and it is possible to change a GTT type for a specific signaling point. Accordingly it is possible to support various GTT types.

Additionally, in an apparatus and a method for translating a GT in a No.7 signaling network in accordance with the preferred embodiment of the present invention, when a specific signaling point receiving a signaling message including a GT cannot perform a GTT due to a change or amendment of a pertinent GTT database, it is possible to change and repair a pertinent GTT database of a specific signaling point by performing a GTT not by the specific signaling point but another signaling point, even in the operation of the signaling network.

In addition, in an apparatus and a method for translating a GT in a No.7 signaling network in accordance with a preferred embodiment of the present invention, when a signaling message including a GT is received at a specific signaling point in which an error occurs, because the specific signaling point does not perform a general GTT but transmits the signaling message immediately to another signaling point by using a pre-fetch GTT module, it is possible to quickly and effectively perform a GTT of a signaling message.

Moreover, in an apparatus and a method for translating a GT in a No.7 signaling network in accordance with a preferred embodiment of the present invention, when a specific signaling point receiving a signaling message including a GT attempts a GTT of the signaling message but fails the GTT, the GTT of the signaling message is performed again at another signaling point through a post-fetch GTT function of the specific signaling point. Accordingly a success rate of a signaling message routing by a GT can be improved.

Additionally, in an apparatus and a method for translating a GT in a No.7 signaling network in accordance with a preferred embodiment of the present invention, by using a pre-fetch GTT module and a post-fetch GTT module of a specific signaling point, by distributing a GT function of the specific signaling point to another signaling point, a load in GTT can be dispersed, and because each signaling point does not have to manage all GTs used in a signaling network, a quantity of a GTT database to be managed at each signaling point can be reduced.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for translating a global title (GT) in a common channel signaling network, comprising:
   a general global title translation (GTT) module configured to perform a general GTT function of a first signaling point;
   a pre-fetch GTT module configured to distribute the general GTT function to a second signaling point before the general GTT function is performed; and
   a post-fetch GTT module configured to provide the general GTT function to the second signaling point when the general GTT function fails.

2. The apparatus of claim 1, wherein the common channel signaling network is a No. 7 signaling network.

3. The apparatus of claim 1, wherein the pre-fetch GTT module is enabled when a GTT type making a signaling transfer point perform the general GTT function is applied to a signaling network.

4. The apparatus of claim 1, wherein the pre-fetch GTT module is disabled when a GTT type making an originating signaling point perform the general GTT function is applied to a signaling network.

5. The apparatus of claim 1, wherein the pre-fetch GTT module is enabled when the first signaling point cannot perform the general GTT function.

6. The apparatus of claim 1, wherein the pre-fetch GTT module comprises a pre-fetch GTT database, and wherein the post-fetch GTT module comprises a post-fetch GTT database.

7. The apparatus of claim 6, wherein the pre-fetch GTT database and the post-fetch GTT database respectively have a field to indicate an enabled/disabled state of a pertinent function and a signaling point code for transmitting a pertinent signaling message.

8. A method for translating a global title (GT) in a common channel signaling network, comprising:
   determining whether a pre-fetch global title translation (GTT) module is enabled when a transmission request of a signaling message including a GT is received at a first signaling point;
   performing a pre-fetch GTT when the pre-fetch GTT module is enabled;
   performing a general GTT when the pre-fetch GTT module is not enabled;
   determining whether a post-fetch GTT module is enabled when the general GTT has failed; and
   performing a post-fetch GTT when the post-fetch GTT module is enabled.

9. The method of claim 8, wherein the common channel signaling network is a No. 7 signaling network.

10. The method of claim 8, further comprises discarding the signaling message when the post-fetch GTT module is not enabled.

11. The method of claim 8, wherein determining whether the pre-fetch GTT module is enabled is performed by checking information recorded on a prescribed field of the pre-fetch GTT database.

12. The method of claim 8, wherein the pre-fetch GTT retrieves a signaling point that performs a GTT of the signaling message in the pre-fetch GTT database.

13. The method of claim 8, wherein determining whether the post-fetch GTT module is enabled is performed by checking information recorded on a prescribed field of a post-fetch GTT database.

14. The method of claim 8, wherein the post-fetch GTT retrieves a signaling point that performs a GTT of the signaling message in the post-fetch GTT database.

15. A method for translating a GT (global title) in a No.7 signaling network, comprising:
   controlling a pre-fetch global title translation (GTT) function and a post-fetch GTT function of each of a plurality of signaling points according to a GTT type applied to a signaling network; and
   performing GTT according to the controlled pre-fetch GTT function and the post-fetch GTT function.

16. The method of claim 15, wherein controlling the pre-fetch GTT function and the post-fetch GTT function of each signaling point comprises:
   setting an enabled/disabled state of the pre-fetch GTT function and the post-fetch GTT function of each signaling point according to the GTT type;
   managing GTT information required by each signaling point by dispersing the GTT information; and
   setting another signaling point performing a general GTT as a substitute for each signaling point.

17. The method of claim 15, wherein a GTT type of a prescribed signaling point can be controlled by controlling a pre-fetch GTT function and a post-fetch GTT function of a prescribed signaling point.

18. An apparatus for translating a global title (GT) in a common channel signaling network, comprising:
   a general global title translation (GTT) module configured to perform a general GTT function of a first signaling point; and
   at least one of a pre-fetch GTT module configured to distribute the general GTT function to a second signaling point before the general GTT function is performed and a post-fetch GTT module configured to provide the general GTT function to the second signaling point if the general GTT function fails.

19. The apparatus of claim 18, wherein the pre-fetch GTT module comprises a pre-fetch GTT database, and wherein the post-fetch GTT module comprises a post-fetch GTT database.

20. The apparatus of claim 19, wherein the pre-fetch GTT database and the post-fetch GTT database respectively have a field to indicate an enabled/disabled state of a pertinent function and a signaling point code for transmitting a pertinent signaling message.

21. A method for translating a global title (GT) in a common channel signaling network, comprising:
   determining whether a pre-fetch global title translation (GTT) module is enabled when a transmission request of a signaling message including a GT is received at a first signaling point;
   performing a pre-fetch GTT when the pre-fetch GTT module is enabled; and
   performing a general GTT when the pre-fetch GTT module is not enabled.

22. The method of claim 21, further comprising
   determining whether a post-fetch GTT module is enabled when the general GTT is attempted and is determined to have failed; and
   performing a post-fetch GTT when the post-fetch GTT module is enabled.

* * * * *